United States Patent [19]

Kikuchi

[11] Patent Number: 4,944,982
[45] Date of Patent: Jul. 31, 1990

[54] INFORMATION RECORDING MEDIUM HAVING MAGNETIZABLE HUB

[75] Inventor: Yasushi Kikuchi, Odawara, Japan

[73] Assignee: Fuji Photo Film Co., Ltd., Kanagawa, Japan

[21] Appl. No.: 332,964

[22] Filed: Apr. 4, 1989

[30] Foreign Application Priority Data

Apr. 4, 1988 [JP] Japan .................................. 63-82820
Apr. 4, 1988 [JP] Japan .................................. 63-82821

[51] Int. Cl.⁵ .................................................. B32B 3/00
[52] U.S. Cl. .................................. 428/64; 428/65; 428/913; 346/1.1; 346/76 L; 346/135.1; 369/272; 369/282
[58] Field of Search ........................... 428/64, 65, 913; 346/1.1, 76 L, 135.1; 369/272, 282

[56] References Cited
FOREIGN PATENT DOCUMENTS
0325399 1/1989 European Pat. Off. .

Primary Examiner—Patrick Ryan
Attorney, Agent, or Firm—Sixbey, Friedman, Leedom & Ferguson

[57] ABSTRACT

An information recording medium for writing and/or reading information by means of a laser beam comprises an information recording disc and a magnetizable hub. The information recording disc has a circular hole at its center, and the magnetizable hub is fitted into the hole of the disc. The magnetizable hub comprises a boss and a flange and has a hole at its center for insertion of a spindle. The boss of the hub has at its bottom a diameter being equal to or larger than the diameter of the circular hole of the recording disc. The magnetizable hub is pushed into the circular hole of the recording disc, whereby the hub is firmly fitted into the hole of the disc. The boss of the magnetizable hub may have an outwardly extended protrusion or raised portion at its bottom. The boss of the magnetizable hub may be divided into three or more separate portions.

8 Claims, 3 Drawing Sheets

INFORMATION RECORDING MEDIUM HAVING MAGNETIZABLE HUB

FIELD OF THE INVENTION

The present invention relates to an information recording medium wherein a hub provided with magnetizable substance is joined. More particularly, it relates to an information recording medium wherein the hub with magnetizable substance is joined with high dimensional accuracy.

BACKGROUND OF THE INVENTION

An information recording medium using high energy density beam such as a laser beam for recording and reading has been developed in recent years and is now put into practical use. The information recording medium is called optical disc and can be used as a video disc, audio disc and disc memory for large-capacity static image files and large-capacity computers.

The optical disc basically comprises a recording layer provided on a disc-shaped transparent substrate of a plastic material or glass. An undercoat layer or intermediate layer of a polymer material can be provided on the surface (on which the recording layer is provided) of the substrate for improving smoothness of the surface, adhesion between the substrate and the recording layer and the light sensitivity of the optical disc.

Writing of information on the optical disc or reading of information from the recording disc is conducted in an information recording or reproducing apparatus by irradiating the recording layer of the disc with a laser beam while rotating the disc on its plane. For the rotation of the optical disc, the disc is mounted onto a rotatable spindle of the apparatus. For facilitating the fitting of an optical disc to the spindle, a separately prepared hub can be provided to the disc. Further, it has been proposed that the hub is made magnetizable so as to more firmly fix the optical disc onto a rotating element of the recording or reproducing appartus. The magnetizable hub is provided with magnetizable (magnetic) substance such as a magnetizable metal plate. Such hub is firmly fitted onto a rotating magnet element of a recording or reproducing apparatus, and therefore a recording medium having such magnetizable hub is firmly mounted onto the rotating element.

The hub has a center hole for insertion of a spindle of the rotating element, and is generally comprises a boss (cylinderical part) and a flange. The hub is joined to an information recording disc in such manner that its boss is inserted into a circular hole of an information recording disc which is formed at the center thereof. The hub is arranged within the information recording disc in such a manner that the hub is made concentric to the center of the disc.

Heretofore, joining of the hub to the information recording disc is conducted by the steps of fixing the disc to a rotatable X-Y table, determining the center of the groove formed on the information recording disc by observing the groove through a microscope while making the X-Y table to rotate, adjusting the X-Y table in such a manner that the center of the groove, which is the center of the information recording disc, coincides with the center of a rotation shaft of the X-Y table, and finally setting the hub to the center of the rotating shaft of the information recording disc to join the hub to the information recording disc. Adhesion or ultrasonic welding or the like can be used for the joining.

Thus, an information recording medium provided with a magnetizable hub has been required to adjust the joining location of the hub as described above. There have been known two different types of hubs; one has a boss having smaller diameter (smaller outer diameter) than that of the circular hole of the information recording disc so as to enable the desired adjustment of the location on joining, and the other has no boss. Therefore, there likely arises eccentricity (locational deviation of the center of the information recording disc and the center of the hole for insertion of a spindle) when joining the hub and the information recording disc together.

In regard to an optical disc having a diameter of 130 mm (5.25 inches), there has been a standard defined by ISO (International Organization for Standardization) with respect to the form and the characteristics of a optical disc employing a magnetizable hub. According to the ISO Standard, it is required that the above-described ecentricity be kept within 25 $\mu$m.

In the conventional process for producing an information recording disc, the step for determining the center of the disc and then joining the hub to the center is done manually for the most part, and the accuracy of the joining depends greatly on the worker's skills. Moreover, it takes not a short period such of time as several minutes to assemble per disc, which gives poor productivity. For this reason, several attempts have been made to conduct a series of the centering processes (which is made to determine the center of the information recording disc) automatically by machine. However, the centering processes using a known machine requires a complicated treatment system as well as high manufacturing cost. Moreover, the use of a known machine for the centering does not give satisfactory increase of productivity.

SUMMARY OF INVENTION

It is an object of the present invention to provide an information recording medium having high dimensional accuracy as well as excellent productivity.

There is provided by the present invention an information recording medium comprising an information recording disc for writing or reading information by means of a laser beam which has a circular hole at its center and a magnetizable hub which comprises a boss and a flange and has a hole at its center for insertion of a spindle, wherein the boss of the magnetizable hub has had at its bottom a diameter being equal to or larger than the diameter of the circular hole of the recording disc, and the magnetizable hub has been pushed into the circular hole of the recording disc, whereby the hub is firmly fitted into the hole of the disc.

The present invention further provides an information recording medium comprising an information recording disc for writing or reading information by means of a laser beam which has a circular hole at its center and a magnetizable hub which comprises a boss and a flange and has a hole at its center for insertion of a spindle, wherein the boss of the magnetizable hub has at its bottom an outwardly extended protrusion or raised portion, and the magnetizable hub has been pushed into the circular hole of the recording disc, whereby the hub is firmly fitted into the hole of the disc.

In the use of an information recording medium of the present invention, there is no need of conducting the conventional centering procedure in joining the hub to the information recording disc. Accordingly, it is easy to manufacture an information recording medium within a reduced period of time and therefore the information recording medium of the invention is suitable for mass production.

Further, the information recording medium of the invention has excellent dimensional accuracy with reliable performance.

Furthermore, a hub having a plurality of outwardly extended protrusions or raised portions is very advantageous, because such hub is brought into contact with the recording disc at only the protrusions or raised portions and thus gives less adverse effect to birefringence of the information recording disc.

DETAILED DESCRIPTION OF THE INVENTION

An information recording medium of the present invention has such basic structure that a magnetizable hub comprising a boss and a flange and having a hole at its center for insertion of a spindle is fitted into a circular hole of an information recording disc. The present invention employs a magnetizable hub of which boss has at its bottom a diameter being equal or larger than the diameter of the center hole of the recording disc. The diameter may be a diameter of an imaginary circle formed by tracing top parts of protrusions formed on the outer wall of the boss. Such specific boss makes the joining of the hub to the disc easy and accurate.

The representative embodiment of the invention is described in detail with reference to the attached drawings.

Figure 1:
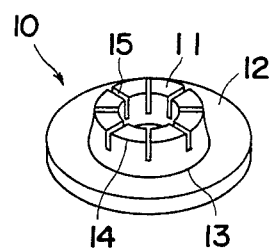
FIG. 1 is a perspective view illustrating an example of a hub employable for an information recording medium according to the invention.
Figure 2:
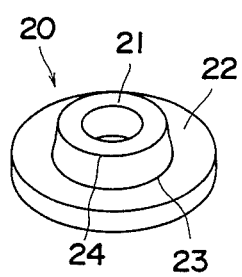
FIG. 2 is a perspective view illustrating another example of the hub employable for the information recording medium according to the invention.
Figure 3:
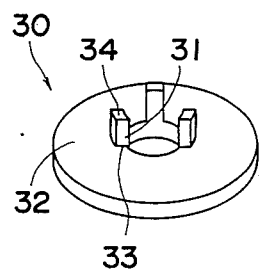
FIG. 3 is a perspective view illustrating a further example of the hub employable for the information recording medium of according to the invention.

Perspective views of examples of the magnetizable hub employable for the information recording medium of the invention (Type I) are illustrated in FIGS. 1-3.

A hub 10 seen in FIG. 1 comprises a boss 11 and a flange 12. A diameter of the boss 11 at its bottom (or base) 13 is made larger than that of a circular hole of the information recording disc. It is preferable that the diameter of the boss at the bottom is larger than the diameter of the circular hole of the disc by 1 to 25 $\mu$m, and more preferably by 5 to 15 $\mu$m. The diameter of the boss at the bottom may be equal to that of the circular hole of the disc.

On the other hand, a diameter of the boss 11 at its top 14 is generally made smaller than that of the circular hole of the information recording disc. The diameter of the boss at its top is preferably smaller than that of the circular hole of the information recording disc by 10 to 500 $\mu$m, and more preferably by 50-200 $\mu$m. The outer wall of the boss 11 is partially tapered from the bottom 13 to the tope 14. The boss 11 may have at its top a diameter equal to that of the circular hole of the information recording disc.

The boss 11 has slits 15 therein. According to the studies made by the present inventors, the boss having slits is easily bendable inwardly, and thus it becomes easier for fitting the boss into the circular hole of the disc in a step of assembling these elements. It is preferable that 4 to 32 slits are formed on the boss radially and at equal spaces. The depth of the slits can be determined optionally.

In FIG. 2, a hub 20 comprises a boss 20 and a flange 22. A diameter of the boss 21 at its bottom 23 is made larger than that of a circular hole of an information recording disc. It is preferable that the diameter of the boss at its bottom is larger than that of the circular hole of the disc by 1 to 25 $\mu$m, and more preferably, by 5 to 15 $\mu$m. The boss may have at its bottom an equal (outer) diameter to that of the circular hole of the disc.

The boss 21 at its top 24 generally has smaller diameter than that of the circular hole of the disc. It is preferable that the diameter of the boss at its top is smaller than that of the circular hole of the disc by 1 to 500 $\mu$m, and more preferably, by 50 to 200 $\mu$m. The outer wall of the boss 21 is tapered partially from the bottom 23 to the top 24. The boss 21 may have at its top 24 an equal diameter to that of the circular hole of the disc.

In FIG. 3, a hub 30 comprises three pillars 31 and a flange 32. The three pillars 31 serve in combination as a boss, and are arranged apart and symmetrically to each other. An imaginary diameter formed by tracing pillars 31 at each bottom 33 is preferably made larger than that of the circular hole of the information recording disc. The imaginary diameter of the pillars at their bottoms is preferably larger than that of the circular hole of the disc by 1 to 25 $\mu$m, more preferably by 5 to 15 $\mu$m. The imaginary diameter of the pillars at their bottoms may be equal to that of the circular hole of the disc.

A diameter of an imaginary circle formed by tracing the each top 34 of the pillars 31 serving as a boss is generally made smaller than that of the circular hole of the information recording disc. It is preferable that the imaginary diameter of the circle formed by tracing each top is smaller than that of the circular hole of the disc by 10 to 500 $\mu$m, and more preferably by 50 to 200 $\mu$m. The outer walls of pillars 31 serving as a boss are tapered partially from the bottom 33 to the top 34. The imaginary diameter formed by the tops may be equal to that of the circular hole of the disc.

Figure 4:
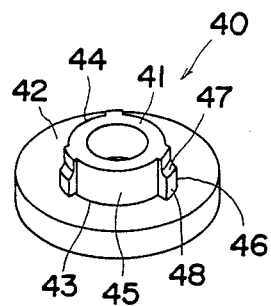
FIG. 4 is a perspective view illustrating a still further example of the hub employable for the information recording medium according to the invention.
Figure 5:
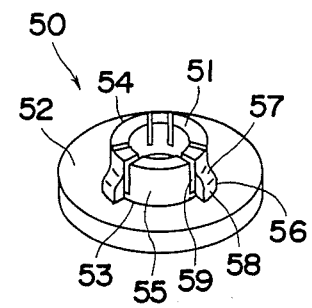
FIG. 5 is a perspective view illustrating a still further example of the hub employable for the information recording medium according to the invention.
Figure 6:
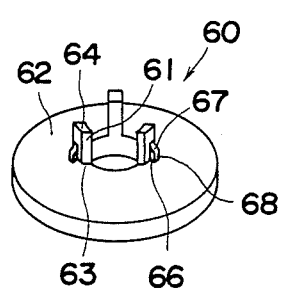
FIG. 6 is a perspective view illustrating a still further example of the hub employable for the information recording medium according to the invention.

Perspective views of examples of a magnetizable hub employable for an information recording medium (Type II) are illustrated in FIGS. 4–6.

In FIG. 4, a hub 40 comprises a boss 41 and a flange 42. Each of the diameters of the boss 41 at its bottom 33 and its top 44 is made smaller than a diameter of the circular hole of the information recording disc.

Three protrusions 46 are formed on the outer wall 45 of the boss 41, each being formed at an angle of 120° (to the center) apart from each other. Each protrusion is preferably formed on the boss 41 at a position close to the bottom 43. Walls 47 of the raised portions 46 are preferably inclined as illustrated.

A diameter of an imaginary circle formed by tracing each top 48 of the protrusions 46 is preferably larger than that of the circular hole of the disc by 1 to 25 $\mu$m, and more preferably by 5 to 15 $\mu$m.

In FIG. 5, a hub 50 comprises a boss 51 and a flange 52. Each of diameters of the boss at its bottom 53 and its top 54 is made smaller than that of the circular hole of the disc.

On the outer wall 55 of the boss 51 are formed three protrusions 56, being apart from each other at a central angle of 120°. It is preferable that the protrusions are formed close to the bottom 53 of the boss 51, and that each wall 57 of the raised portions 56 is inclined as illustrated in the drawing.

A imaginary diameter of the circle formed by tracing each top face 58 of the protrusions 56 is preferably made larger than that of the circular hole of the information recording disc by 1–25 $\mu$m, and more preferably by 5–15 $\mu$m.

The boss 51 has slits 59 therein. The advantageous feature of the slits is described hereinbefore.

Figure 6A:
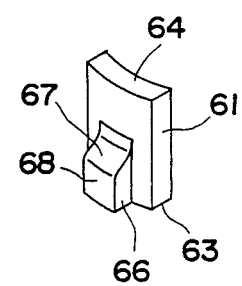
FIG. 6A is an enlarged perspective view of pillar 61 illustrated in FIG. 6.

In FIG. 6, a hub 60 comprises three pillars 61 and a flange 62. The pillars 61 serve in combination as a boss and are arranged apart and symmetrically to each other. Each of diameters of circles formed by tracing bases 63 and tops 64 of the pillars 61 is made smaller than that of the circular hole of the information recording disc. FIG. 6A is an enlarged perspective view of the pillar 61.

Pillars 61 are arranged at three locations on the flange 35 being apart from each other at a central angle of 120°. On the pillars 61, protrusions 66 are formed. It is especially preferable that the protrusion is formed on the pillar 61 close to the bottom 63. It is also preferable that a wall 67 of the protrusion being close to the top 64 is inclined as illustrated.

An imaginary diameter of the circle formed by tracing each top face 68 of the protrusions 66 is preferably larger than that of the circular hole of the information recording disc by 1–25 $\mu$m, and more preferably by 5–15 $\mu$m.

Figure 7:
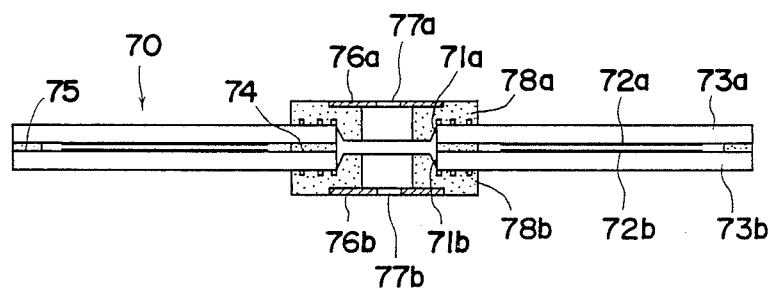
FIG. 7 is a sectional view illustrating an example of an information recording medium according to the invention.

In FIG. 7, an information recording medium 70 of the invention comprises a pair of information recording discs 73a, 73b, each having a hole at its center 71a, 71b and having recording layers 72a, 72b. The discs are joined to each other through an inner-side ring-shaped spacer 74 and an outer-side ring-shaped spacer 75 with each recording layer 72a, 72b positioned inwards.

Into the center of both surfaces of the joined two information recording discs 72a, 72b are fitted hubs 78a, 78b provided with magnetizable body 76a, 76b and holes 77a, 77b for insertion of a spindle. Each of the hubs 78a, 78b is joined to the information recording disc 73a, 73b correspondingly by ultrasonic welding without any eccentricity.

An example of a process for producing the information recording medium 70 of to the invention illustrated in FIG. 7 is described with reference to the attached FIG. 8.

Figure 8:
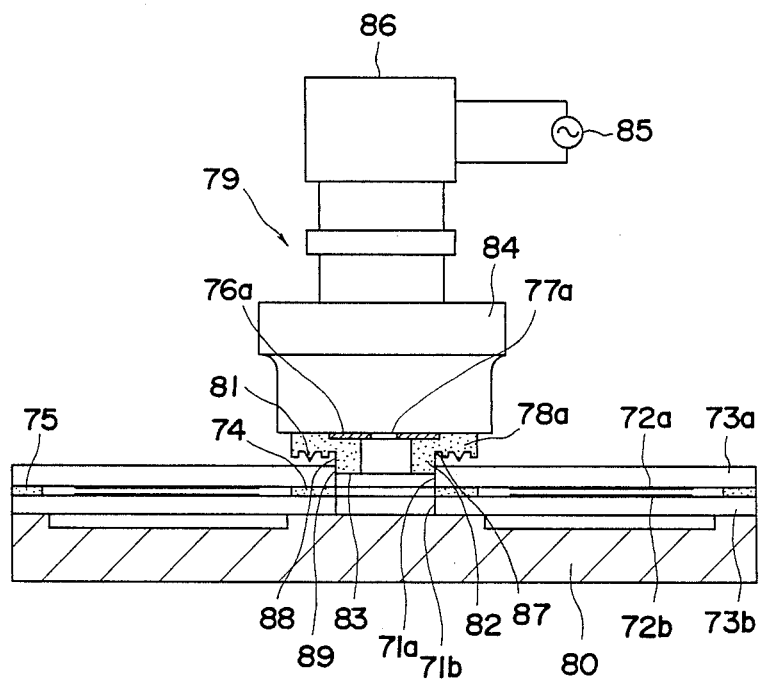
FIG. 8 is a view illustrating an example of a process for producing an information recording medium of the invention.

FIG. 8 is a sectional view illustrating an example of two information recording discs 73a, 73b joined by the inner-side ring-shaped spacer 74 and the outer-side ring-shaped spacer 75 wherein the joining of the hub 78a provided with magnetizable substance 76a and the hole 77a for insertion of a spindle to the side of information recording disc 73a is made using a ultrasonic welding machine 79. The information recording discs 73a, 73b joined together through the inner-side ring-shaped spacer 74 and the outer-side ring-shaped spacer 75 with both recording layers 72a, 72b positioned inwards are placed in a receiving tool 80.

To the center of the information recording disc 73a is arranged the hub 78a. Only a top part 83 of a boss 82 of the hub 78a is fitted into the circular hole 71a located at the center of the information recording disc 73a. Since the top 83 of the boss 82 of the hub 78a is made smaller than that of the circular hole 71a of the information recording disc 73a, that top 83 of the boss 82 can be smoothly fitted into the circular hole 71a.

Subsequently, the hub 78a is welded to join to the center of the information recording disc 73a by the use of ultrasonic welding machine 79. The ultrasonic welding machine is equipped with an applying horn 84 for application of ultrasonic wave. Ultrasonic wave is generated from an ultrasonic generator 85, transmitted to the applying horn 84 through a converter 86. The joining of the hub 78a to the information recording disc 73a is carried out first by descending the applying horn 84 of ultrasonic welding machine 79 to press the hub 78a. While a ring-form raised portion 81 on the flange of the hub 78a is kept pressing, ultrasonic wave is applied to the information recording disc 73a through the applying horn 84.

The boss 82 of the hub is tapered partially from the bottom 87 to the top 83, so that the boss is smoothly fitted into the circular hole 71a of the information recording disc 73a by pressure of the applying horn 84.

The diameter of the boss at its bottom of the hub of Type I is larger than that of the circular hole of the information recording disc while the diameter of the top part of the boss is smaller than that of the circular hole, and that the boss has a tapered portion from its top to the bottom. Accordingly, the hub is gradually and firmly pushed into the circular hole of the information recording disc by applying pressure. Accordingly, the information recording medium of the invention can be produced with high accuracy even by using the ultrasonic welding method. The use of ultrasonic welding method is generally apt to generate the eccentricity (locational deviation of the center) of the hub by vibration of ultrasonic wave.

In the case of using a hub of Type II, the hub can be gradually and firmly pushed into the circular hole of the recording disc by application of pressure. Accordingly, the information recording medium of the invention can be produced with high accuracy even by using the ultrasonic welding method.

While the information recording medium described above with the attached drawings is in accordance with the present invention, it is by no means limited to the embodiment described the above.

For example, the boss of the hub may be tapered throughly through its top to the base. The top part(s) of the boss of the hub may be provided with beveling(s) or radius (radii).

For the joining of the hub to the disc, an adhesive can be used, or mechanical fitting can be utilized.

In the case of the hub having protrusions on the outer surface of the boss, there may be formed more than three protruted portions on the boss.

The optical disc may be a magenetic optical disc of which recording layer comprises magnetic layers.

Spacers, hubs, substrates and recording layers which are conventionally used, can be used in the production of information recording medium of the invention. These materials will be briefly described below.

Material for the spacer is not specifically limited, and may include a metal such as aluminum and a synthetic resin which is conventionally used for spacers. A spacer made of a synthetic resin can be produced by injection molding. A metal spacer such as an aluminum spacer can be produced by milling process or cutting process.

Material for the magnetizable hub is not especially limited so long as it is favorably joined to the disc-shaped substrates, and may include thermoplastic resins such as polycarbonate resin or acetal resin. It is desirable that the same material as that for the disc-shaped substrate is used as the hub material in consideration of coefficients of thermal expansion and moisture absorption expansion.

Magnetizable body, an essential constituent of the magnetizable hub, is made of magnetizable substance such as iron or iron-containing alloy, and preferably is a substance hardly to rust. The forms of the magnetizable body are not especially limited. Examples of its representative forms include magnetizable pieces such as those in the form of a stick, a sheet or a ring, and further magnetizable powders made by powdering the magnetizable substance. The magnetizable powders can be kneaded into the resin material of the hub to carry out injection molding.

Material of the substrate employable in the invention can be optionally selected from those used for the known information recording media. As substrate materials, preferably employed are acrylic resins such as cell cast polymethyl methacrylate, injection-molded polymethyl methacrylate and polymethyl acrylate; vinyl chloride resins such as polyvinyl chloride and vinyl chloride copolymers; epoxy resins; amorphous polyolefins; and other synthetic resins such as polycarbonate, from the view-points of optical characteristics, surface smoothness, processability, handling properties, long-term stability and manufacturing cost. Polymethyl methacrylate, polycarbonates and epoxy resins are preferred from the view-points of dimensional stability, transparency and surface smoothness.

On the surface of the substrate where the recording layer is to be formed, an undercoat layer (and/or an intermediate layer) may be provided to improve surface smoothness and adhesion or prevent the recording layer from being denatured.

Examples of materials for the preparation of the undercoating layer and the intermediate layer include polymer materials such as polymethyl methacrylate, acrylic acid-methacrylic acid copolymer, nitrocellulose, polyethylene and polycarbonate; organic materials such as silane coupling agent; and inorganic material such as inorganic oxides (e.g., $SiO_2$, $A\lambda_2O_3$) and inorganic fluorides (e.g., $MgF_2$).

Examples of materials for the preparation of the recording layer include metals such as Te, Zn, In, Sn, Zr, $A\lambda$, Ti, Cu, Ge, Au and Pt; semimetals such as Bi, As and Sb; semiconductors such as Si; and alloys or mixtures thereof. Also employable are compounds of these metals, semimetals and semiconductors such as sulfides, oxides, borides, silicates, carbides and nitrides, or mixtures of these compounds and metals. Otherwise, dyes or combinations of dyes and polymers, the above-mentioned metals or semimetals can be also employed as the recording layer material.

The recording layer may contain other metals, semimetals or compounds thereof than the above-mentioned ones which are conventionally used for known recording media.

The recording layer can be formed on the substrate directly or through an undercoat layer by means of metallizing, sputtering, ion plating or coating. The recording layer may be composed of a single layer or plural layers. The thickness of the recording layer is generally in the range of 100 to 5,500 angstroms, preferably 150 to 1,000 angstroms from the viewpoint of optical density required for optical information recording.

On the surface of the substrate not facing the recording layer may be provided a thin film of an inorganic material such as silicon dioxide, tin oxide or magnesium fluoride or a polymer material such as a thermoplastic resin or a photo-setting resin by means of vacuum deposition, sputtering or coating to enhance resistance to damage and resistance to moisture. Further, the recording layer can be formed on the regions that spacers and substrates are joined together other than the recording regions.

I claim:

1. An information recording medium comprising an information recording disc for writing or reading information by means of a laser beam which has a circular hole at its center and a magnetizable hub which comprises a boss and a flange and has a hole at its center for insertion of a spindle, wherein the boss of the magnetizable hub has had at its bottom a diameter being equal to or larger than the diameter of the circular hole of the recording disc, and the magnetizable hub has been pushed into the circular hole of the recording disc, whereby the hub is firmly fitted into the hole of the disc.

2. The information recording medium as claimed in claim 1, wherein the boss of the magnetizable hub has at its top a diameter smaller than the diameter of the hole of the disc.

3. The information recording medium as claimed in claim 1, wherein the boss of the magnetizable hub has plural slits at its top part.

4. The information recording medium as claimed in claim 1, wherein the boss of the magnetizable hub comprises not less than three pillars arranged apart and symmetrically to each other.

5. An information recording medium comprising an information recording disc for writing or reading information by means of a laser beam which has a circular hole at its center and a magnetizable hub which comprises a boss and a flange and has a hole at its center for insertion of a spindle, wherein the boss of the magnetizable hub has at its bottom an outwardly extended protrusion or raised portion, and the magnetizable hub has been pushed into the circular hole of the recording disc, whereby the hub is firmly fitted into the hole of the disc.

6. The information recording medium as claimed in claim 5, wherein the boss of the magnetizable hub has plural slits at its top part.

7. The information recording medium as claimed in claim 5, wherein the boss of the magnetizable hub comprises not less than three pillars arranged apart and symmetrically to each other.

8. The information recording medium as claimed in claim 5, wherein the boss of the magnetizable hub comprises not less than three pillars arranged apart and symmetrically to each other, said pillars having the outwardly extended protrusion or raised portion.

* * * * *